United States Patent

Liu

(10) Patent No.: US 9,563,096 B2
(45) Date of Patent: Feb. 7, 2017

(54) 3D DISPLAY APPARATUS AND DYNAMIC GRATING

(71) Applicant: SHENZHEN ESTAR TECHNOLOGY GROUP CO., LTD., Shenzhen, Guangdong Province (CN)

(72) Inventor: Meihong Liu, Shenzhen (CN)

(73) Assignee: SHENZHEN MAGIC EYE TECHNOLOGY CO., LTD., Shenzhen, Guangdong Province (CN)

( * ) Notice: Subject to any disclaimer, the term of this patent is extended or adjusted under 35 U.S.C. 154(b) by 265 days.

(21) Appl. No.: 14/574,382

(22) Filed: Dec. 17, 2014

(65) Prior Publication Data

US 2016/0182899 A1 Jun. 23, 2016

(51) Int. Cl.
*G02F 1/1335* (2006.01)
*G02F 1/155* (2006.01)
*H04N 13/04* (2006.01)

(52) U.S. Cl.
CPC .......... *G02F 1/155* (2013.01); *H04N 13/0409* (2013.01); *H04N 13/0477* (2013.01)

(58) Field of Classification Search
CPC .... G02F 1/15; G02F 2001/1555; G02F 1/155; H04N 13/0409; H04N 13/0477; H04N 13/0484; H04N 13/0468
See application file for complete search history.

(56) References Cited

U.S. PATENT DOCUMENTS

| | | | | |
|---|---|---|---|---|
| 2003/0227664 A1* | 12/2003 | Agrawal | ............... | G02F 1/1523 359/269 |
| 2010/0253767 A1* | 10/2010 | Wang | ................ | H04N 13/0409 348/51 |
| 2015/0131139 A1* | 5/2015 | Tsukamoto | ............. | G02F 1/155 359/266 |

* cited by examiner

*Primary Examiner* — Nathanael R Briggs
(74) *Attorney, Agent, or Firm* — Cheng-Ju Chiang (57) ABSTRACT

A 3D display apparatus is provided, which comprises: a display, a camera configured to track human-eye position information of human eyes, and a processor electrically connected with the camera and configured to generate a control signal according to the human-eye position information. Preferably, the display comprises a dynamic grating, which is electrically connected with the processor and configured to, according to the control signal, control bright and dark stripes of the dynamic grating to change in position adaptively according to positions of human eyes. Thereby, the 3D display apparatus of the present disclosure utilizes the camera to track human-eye position information and then utilizes the control unit to change positions of bright and dark stripes of the grating according to the human-eye position information so as to adapt to different observing positions of the user's two eyes, thus achieving a 3D image effect.

14 Claims, 5 Drawing Sheets

3D DISPLAY APPARATUS AND DYNAMIC GRATING

FIELD OF THE INVENTION

The present disclosure generally relates to the technical field of display technologies, and more particularly, to a three-dimensional (3D) display apparatus.

BACKGROUND OF THE INVENTION

In the current grating technologies, after a grating is fabricated, positions of bright and dark stripes of the grating become fixed, and this is inconvenient in use. Particularly when the parallax barrier technology is adopted to achieve displaying of a 3D image, a 3D image effect can be perceived by the user only when the user's eyes are located within a specific range because the positions of the bright and dark stripes of the grating are uncontrollable. This affects application of the parallax barrier 3D displaying technology in the daily life.

Accordingly, a 3D display apparatus needs to be provided to solve the aforesaid technical problem.

SUMMARY OF THE INVENTION

A primary objective of the present disclosure is to provide a 3D display apparatus and a dynamic grating used in the 3D display apparatus, which utilizes a camera to track human-eye position information and then utilizes a control unit to change positions of bright and dark stripes of a grating according to the human-eye position information so as to adapt to different observing positions of the user's two eyes, thus achieving a 3D image effect.

To achieve the aforesaid objective, a technical solution adopted in the present disclosure is to provide a 3D display apparatus, which comprises:

a display;

a camera, disposed on a front end surface of the display to track human-eye position information of human eyes;

a processor electrically connected to the camera, being configured to generate a control signal according to the human-eye position information;

wherein the display comprises a dynamic grating electrically connected to the processor, the dynamic grating comprises a first substrate, an electrolyte layer, an electrochromic layer and a second substrate arranged in this order, the first substrate, the electrolyte layer and the second substrate transmit light incident thereon, the first substrate is formed with a first conductive layer on a surface thereof, the second substrate is formed with a second conductive layer on a surface thereof, the second conductive layer comprises a plurality of second electrodes and black insulation bars disposed between adjacent ones of the second electrodes, the electrochromic layer comprises a plurality of identical electrochromic sheets arranged at equal intervals and light-transmitting clearances between adjacent ones of the electrochromic sheets, the second electrodes make contact with the electrochromic sheets in one-to-one correspondence, the dynamic grating further comprises a control unit, the control unit is configured to control ON/OFF of a voltage applied to the electrochromic sheet between the first conductive layer and each of the second electrodes according to the control signal so that bright and dark stripes of the grating change in position adaptively according to different observing positions of the user's two eyes, and then the electrochromic sheets not applied with the voltage is colored by ions from the electrolyte layer to present dark stripes that are opaque while the electrochromic sheets applied with the voltage is decolored by ions from the electrolyte layer to present bright stripes that are light transmissive.

Preferably, the control unit is configured to control ON/OFF of the voltage applied to the electrochromic sheet between each of the second electrodes and the first conductive layer independently.

Preferably, the plurality of second electrodes arranged at equal intervals include first groups of second electrodes and second groups of second electrodes arranged alternately, each of the first groups of second electrodes includes N (where N≥2, and N is a natural number) second electrodes, each of the second groups of second electrodes includes M (where M≥2, and M is a natural number) second electrodes, all the $1^{st}$ second electrodes in the first groups of second electrodes are electrically connected to a same output terminal of the control unit, all the $2^{nd}$ second electrodes in the first groups of second electrodes are electrically connected to a same output terminal of the control unit, . . . , and all the $N^{th}$ second electrodes in the first groups of second electrodes are electrically connected to a same output terminal of the control unit, all the $1^{st}$ second electrodes in the second groups of second electrodes are electrically connected to a same output terminal of the control unit, all the $2^{nd}$ second electrodes in the second groups of second electrodes are electrically connected to a same output terminal of the control unit, . . . , and all the $M^{th}$ second electrodes in the second groups of second electrodes are electrically connected to a same output terminal of the control unit.

Preferably, each of the electrochromic sheets has a width of a, and the light-transmissive clearance between any two adjacent electrochromic sheets has a width of b, where a≥5b.

Preferably, each of the electrochromic sheets comprises: a printable electrochromic ink, or an electrochromic thin film, or a piece of electrochromic glass, or an electrically-controlled light-transmissive thin film.

Preferably, the electrolyte layer comprises a printable electrolyte ink.

Preferably, the first conductive layer comprises a printable transparent conductive ink, or a conductive plastic thin film, or a piece of indium tin oxide (ITO) conductive glass;

and each of the second electrodes comprises a printable transparent conductive ink, or a conductive plastic thin film, or a piece of ITO conductive glass.

To achieve the aforesaid objective, another technical solution adopted in the present disclosure is to provide dynamic grating used in a three-dimensional (3D) display apparatus, which comprises: a first substrate, an electrolyte layer, an electrochromic layer and a second substrate arranged in this order, the first substrate, the electrolyte layer and the second substrate transmit light incident thereon, the first substrate is formed with a first conductive layer on a surface thereof, the second substrate is formed with a second conductive layer on a surface thereof, the second conductive layer comprises a plurality of second electrodes and black insulation bars disposed between adjacent ones of the second electrodes, the electrochromic layer comprises a plurality of identical electrochromic sheets arranged at equal intervals and light-transmitting clearances between adjacent ones of the electrochromic sheets, the second electrodes make contact with the electrochromic sheets in one-to-one correspondence, the dynamic grating further comprises a control unit, the control unit is configured to control ON/OFF of a voltage applied to the electrochromic sheet between the first conductive layer and each of the second electrodes according to a control signal so that bright and dark stripes of the grating change in position adaptively according to different observing positions of an user's two eyes, and then the electrochromic sheets not applied with the voltage is colored by ions provided by the electrolyte layer to present dark stripes that are opaque while the electrochromic sheets applied with the voltage is decolored by ions provided by the electrolyte layer to present bright stripes that are light transmissive.

The present disclosure has the following benefits: as compared to the prior art, the 3D display apparatus of the present disclosure utilizes a camera to track human-eye position information and then utilizes a control unit to change positions of bright and dark stripes of a grating according to the human-eye position information so as to adapt to different observing positions of the user's two eyes, thus providing a 3D image effect for naked eyes.

DETAILED DESCRIPTION OF THE INVENTION

Figure 1:
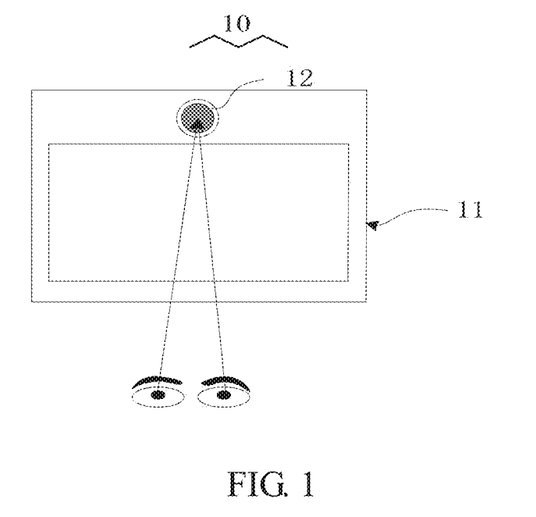
FIG. 1 is a simple schematic structural view illustrating an embodiment of a 3D display apparatus of the present disclosure.
Figure 2:
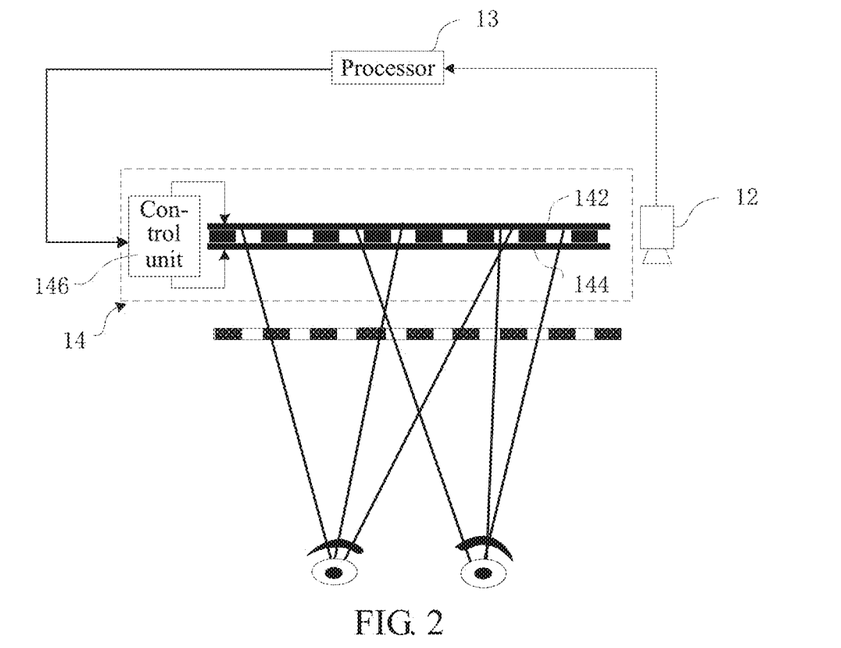
FIG. 2 is a schematic view illustrating a first embodiment of circuit structures and light propagation of the 3D display apparatus in FIG. 1.
Figure 3:
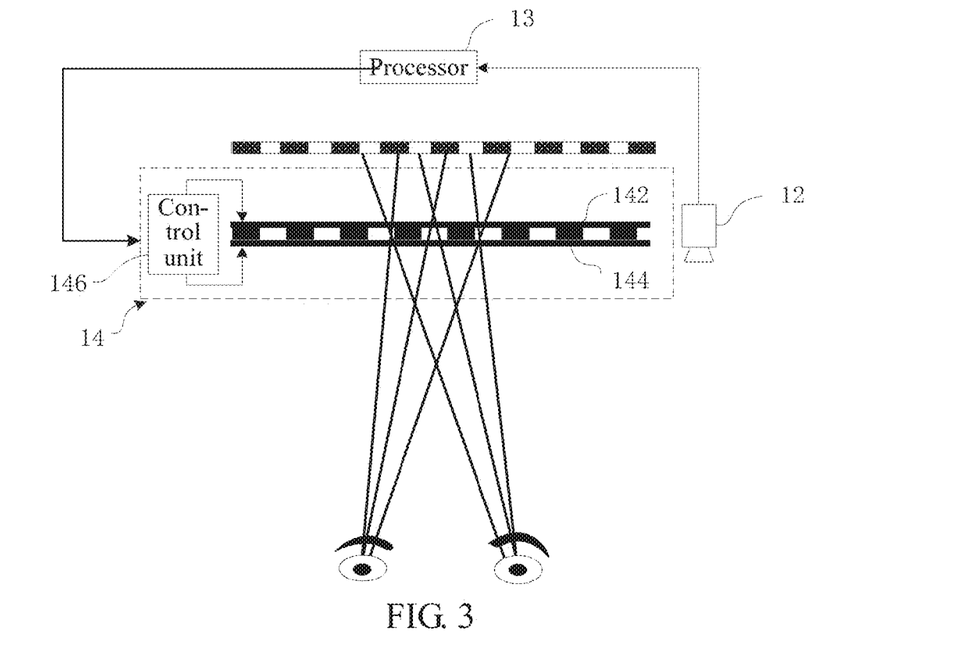
FIG. 3 is a schematic view illustrating a second embodiment of the circuit structures and the light propagation of the 3D display apparatus in FIG. 1.

Referring to FIGS. 1~3, FIG. 1 is a simple schematic structural view illustrating an embodiment of a 3D display apparatus of the present disclosure; FIG. 2 is a schematic view illustrating a first embodiment of circuit structures and light propagation of the 3D display apparatus in FIG. 1; and FIG. 3 is a schematic view illustrating a second embodiment of the circuit structures and the light propagation of the 3D display apparatus in FIG. 1. As shown in FIG. 1, the 3D display apparatus 10 of the present disclosure comprises: a display 11, a camera 12 and a processor 13 (depicted in FIG. 2).

As shown in FIG. 2, the camera 12 is disposed on a front end surface of the display 11 to track human-eye position information of human eyes; the processor 13, which is electrically connected to the camera 12, is configured to receive human-eye position information from the camera 12 and generate a control signal according to the human-eye position information; and the display 11 comprises a dynamic grating 14 which is electrically connected to the processor 13. The dynamic grating 14 receives the control signal and controls positions of bright and dark stripes according to the control signal to adapt to positions of human eyes so that light incident into the dynamic grating 14 is further transmitted through light-transmitting clearances of the dynamic grating 14 onto display pixels of the display 11. Thus, the left-eye pixel image light is incident into the left eye of the user, and the right-eye pixel image light is incident into the right eye of the user. Because images received by the user's two eyes have a parallax therebetween, the left-eye image and the right-eye image are combined in the user's brain to form a 3D image effect. Please refer to FIG. 3. FIG. 3 differs from FIG. 2 in that: light is firstly incident onto the display pixels of the display 11 so that the left-eye pixel image light is incident into the user's left eye via the light-transmitting clearances of the dynamic grating 14 and the right-eye pixel image light is incident into the user's right eye after transmitting through the light-transmitting clearances of the dynamic grating 14.

The dynamic grating 14 shown in FIG. 2 and FIG. 3 further comprises a control unit 146. The control unit 146 is configured to control ON/OFF of a voltage applied to the electrochromic sheet between the first conductive layer 142 and each of the second electrodes 1441 according to the control signal received from the processor 13 so that bright and dark stripes of the grating change in position adaptively according to different observing positions of the user's two eyes. Then, the electrochromic sheets not applied with the voltage is colored by ions from the electrolyte layer 147 to present dark stripes that are opaque while the electrochromic sheets applied with the voltage is decolored by ions from the electrolyte layer 147 to present bright stripes that are light transmissive.

Figure 4:
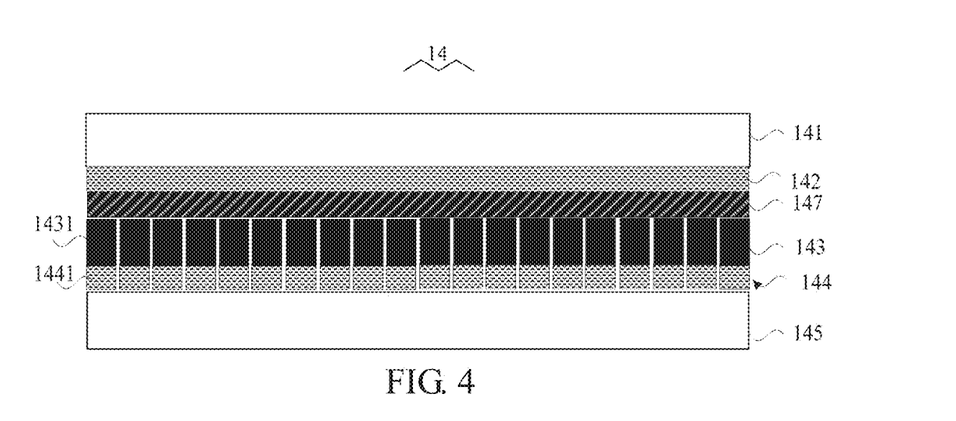
FIG. 4 is a schematic structural view illustrating an embodiment of a dynamic grating of the 3D display apparatus of the present disclosure.

Please refer to FIG. 4, which is a schematic structural view illustrating an embodiment of the dynamic grating of the 3D display apparatus of the present disclosure. As shown in FIG. 4, the dynamic grating 14 of the present disclosure comprises: a first substrate 141, an electrochromic layer 143, a second substrate 145, a control unit 146 (not depicted) and an electrolyte layer 147. The first substrate 141, the electrolyte layer 147 and the second substrate 145 transmit light incident thereon. Preferably, in the direction perpendicular to a displaying surface of the display 11, the first substrate 141, the electrolyte layer 147, the electrochromic layer 143 and the second substrate 145 are arranged in sequence.

Figure 5:
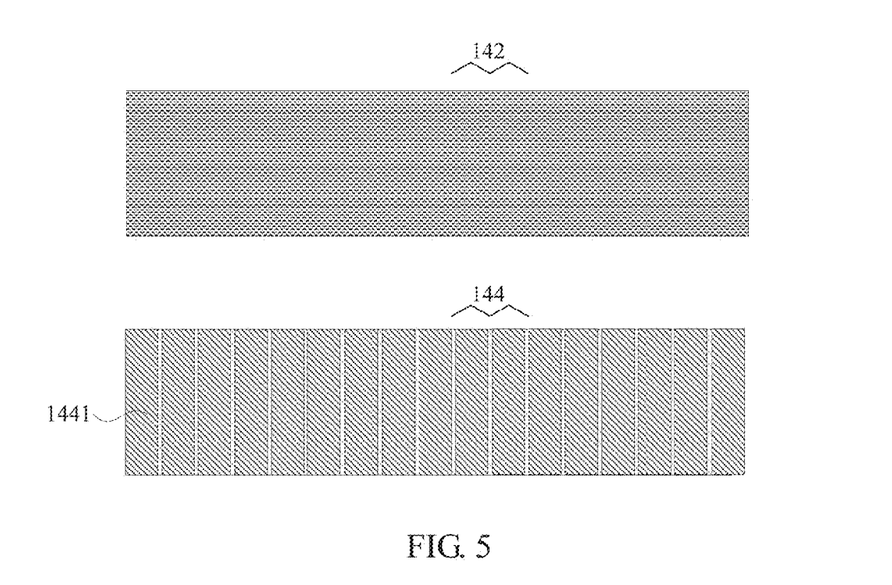
FIG. 5 is a schematic view illustrating electrode arrangement of a first conductive layer and a second conductive layer of the dynamic grating 14 shown in FIG. 4.

Referring still to FIG. 4, the first substrate 141 is formed with a first conductive layer 142 on a surface thereof. A structural view of the first conductive layer 142 is shown in FIG. 5 (FIG. 5 is a schematic view illustrating electrode arrangement of the first conductive layer and the second conductive layer of the dynamic grating 14 shown in FIG. 4). The first conductive layer 142 is completely electrically conductive. The second substrate 145 is formed with a second conductive layer 144 on a surface thereof, the second conductive layer 144 comprises a plurality of second electrodes 1441 and black insulation bars disposed between adjacent ones of the second electrodes. The electrochromic layer 143 comprises a plurality of identical electrochromic sheets 1431 arranged at equal intervals and light-transmitting clearances between adjacent ones of the electrochromic sheets, and the second electrodes 1441 make contact with the electrochromic sheets 1431 in one-to-one correspondence.

Figure 6:
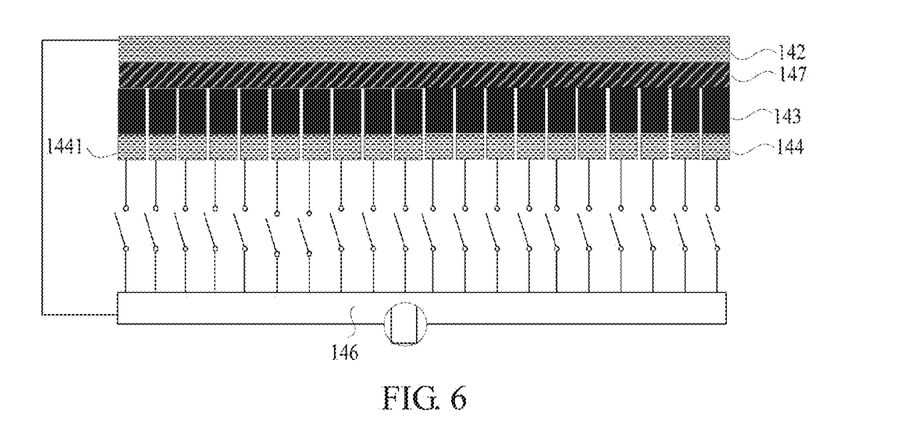
FIG. 6 is a schematic view illustrating a first kind of circuit connection of the dynamic grating 14 shown in FIG. 4.

Please refer to FIG. 6, which is a schematic view illustrating a first kind of circuit connection of the dynamic grating 14 shown in FIG. 4. As shown in FIG. 6, the first conductive layer 142 is electrically connected with the control unit 146, and each of the second electrodes 1441 is connected to the control unit 146 via respective conductors separately. When the control unit 146 controls a corresponding switch to be switched on/off independently according to the control signal, the electrochromic sheets 1431 applied with the voltage between the first conductive layer 142 and the corresponding second electrodes 1441 (i.e., the second electrodes 1441 in the same circuit as the corresponding switch) is decolored by ions from the electrolyte layer 147 to present bright stripes that are light transmissive, while the electrochromic sheets 1431 not applied with the voltage between the first conductive layer 142 and the corresponding second electrodes 1441 (i.e., the second electrodes 1441 in the same circuit as the corresponding switch) is colored by ions from the electrolyte layer 147 to present dark stripes that are opaque. As a result, a slit grating with alternate bright and dark stripes is formed by the electrochromic layer 143. Because positions of the bright and dark stripes of the grating are decided by the control signal, adaptive changes in position of bright and dark stripes are finally decided by positions of human eyes accordingly.

Figure 7:
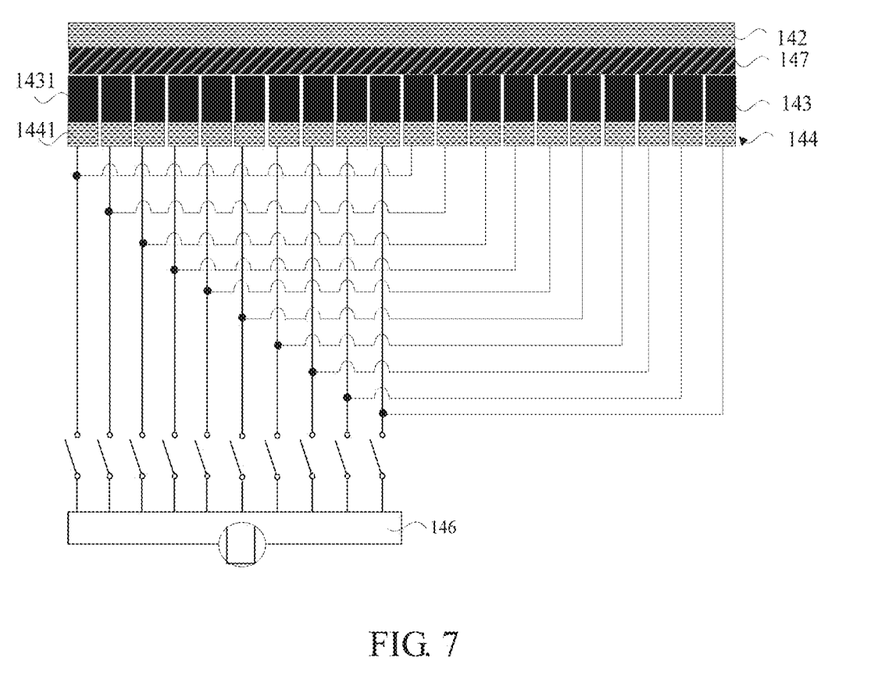
FIG. 7 is a schematic view illustrating a second kind of circuit connection of the dynamic grating 14 shown in FIG. 4.

Please refer to FIG. 7, which is a schematic view illustrating a second kind of circuit connection of the dynamic grating 14 shown in FIG. 4. As shown in FIG. 7, in a preferred embodiment of the dynamic grating of the present disclosure, the plurality of second electrodes arranged at equal intervals include first groups of second electrodes and second groups of second electrodes arranged alternately. Each of the first groups of second electrodes includes N (where N≥2, and N is a natural number) second electrodes 1441, and each of the second groups of second electrodes includes M (where M≥2, and M is a natural number) second electrodes 1441. All the $1^{st}$ second electrodes 1441 in the first groups of second electrodes are electrically connected to a same output terminal of the control unit, all the $2^{nd}$ second electrodes 1441 in the first groups of second electrodes are electrically connected to a same output terminal of the control unit, . . . , and all the $N^{th}$ second electrodes 1441 in the first groups of second electrodes are electrically connected to a same output terminal of the control unit; and all the $1^{st}$ second electrodes 1441 in the second groups of second electrodes are electrically connected to a same output terminal of the control unit, all the $2^{nd}$ second electrodes 1441 in the second groups of second electrodes 1441 are electrically connected to a same output terminal of the control unit, . . . , and all the $M^{th}$ second electrodes 1441 in the second groups of second electrodes are electrically connected to a same output terminal of the control unit. Specifically, referring to FIG. 7 where M and N are both 5 for example, one control voltage output terminal of the control unit 146 may control ON/OFF of a voltage applied to the electrochromic sheets 1431 between a plurality of second electrodes 1441 and the first conductive layer 142 at the same time so that bright and dark stripes of the grating may change in position.

In the embodiment of the present disclosure, each of the electrochromic sheets 143 has a width of a, and the light-transmissive clearance between any two adjacent electrochromic sheets 143 has a width of b, where a≥5b. In the specific design of the dynamic grating 14 of the present disclosure, preferably a>>5b.

The electrochromic sheets 143 adopted in the present disclosure each comprise: a printable electrochromic ink, or an electrochromic thin film, or a piece of electrochromic glass, or an electrically-controlled light-transmissive thin film. The electrolyte layer adopted in the present disclosure comprises a printable electrolyte ink. The first conductive layer adopted in the present disclosure comprises a printable transparent conductive ink, or a conductive plastic thin film, or a piece of indium tin oxide (ITO) conductive glass. Each of the second electrodes comprises a printable transparent conductive ink, or a conductive plastic thin film, or a piece of ITO conductive glass.

Figure 8A:
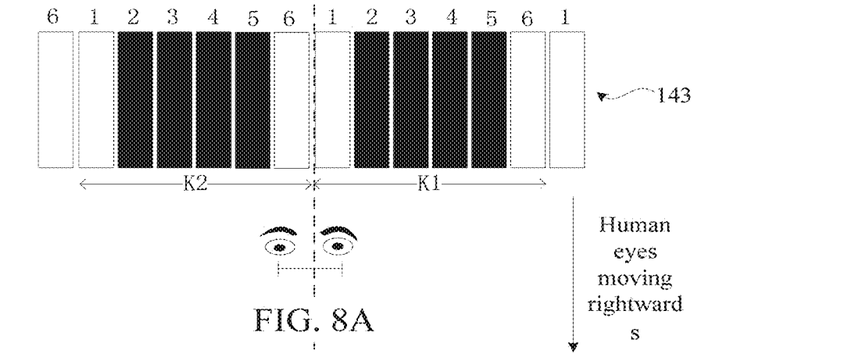
FIGS. 8A~8C depict a schematic view of an example illustrating that bright and dark stripes of the grating change in position as human eyes move in the 3D display apparatus of the present disclosure.
Figure 8B:
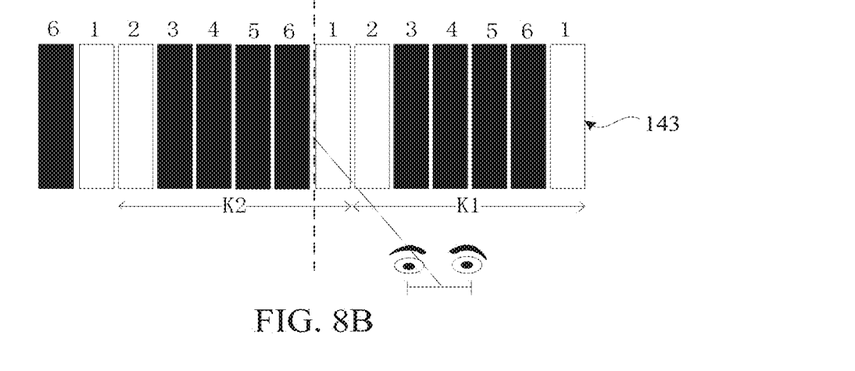
Figure 8C:
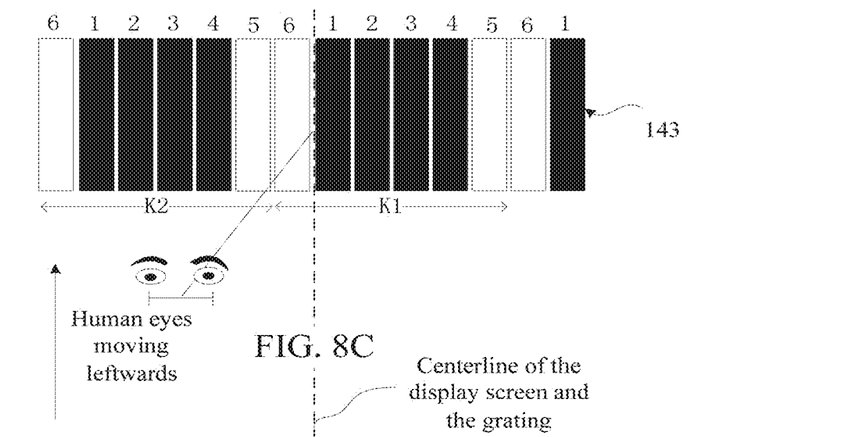

The 3D display apparatus 10 of the present disclosure utilizes the camera 12 to track human-eye position information of human eyes to change the dynamic grating 14 according to the change of the human-eye positions, thus achieving a naked-eye 3D image effect for the 3D display apparatus 10 of the present disclosure at wide view angles. Specifically, referring to FIGS. 8A~8C, FIGS. 8A~8C depict a schematic view of an example illustrating that bright and dark stripes of the grating change in position as human eyes move in the 3D display apparatus of the present disclosure. In FIGS. 8A~8C, the width of one period of the bright and dark stripes is equal to a sum of widths of the electrochromic sheets labeled by 1~6 and light-transmitting clearances therebetween.

As shown in FIG. 8A, the camera 12 picks up that the human eyes are on the centerline of the display screen and the grating; the processor 13 generates a control signal after receiving and processing the human-eye position information; and the control unit 146 receives the control signal and controls ON/OFF of a voltage applied to the electrochromic sheets labeled by 1 and 6 according to the control signal so that the positions of the bright and dark stripes of the grating of the present disclosure adapt to the positions of the human eyes. Thus, a left-eye image and a right-eye image displayed by the display screen can be seen by the user to form a 3D image effect. Specifically, as shown in FIG. 8A, the control unit 146 controls the electrochromic sheets labeled by 1 and 6 to be applied with a voltage so that the electrochromic sheets labeled by 1 and 6 are decolored by ions from the electrolyte layer to present bright stripes that are light transmissive; and the control unit 146 controls the electrochromic sheets labeled by 2~5 not to be applied with a voltage so that the electrochromic sheets labeled by 2~5 are colored by ions from the electrolyte layer to present dark stripes that are opaque. As a result, a 3D image effect can be finally perceived by the two eyes of the user located on the centerline of the display and the grating. Of course, in practical applications of the present disclosure, the periodic width of the bright and dark stripes is not limited to the grating periodic width indicated by K1 or K2 in FIG. 8C.

As shown in FIG. 8B, when the human eyes move rightwards to a position shown in FIG. 8, K1 or K2 moves rightwards by a certain distance d under the control of the control unit 146. Specifically in FIG. 8A, one period of bright and dark stripes wholly move rightwards by a distanced. The electrochromic sheets labeled by 1 and 2 present bright stripes, while the electrochromic sheets labeled by 4~6 present dark stripes. Of course, when human eyes further move rightwards to another specific position, K1 or K2 will further move rightwards by a certain distance with respect to FIG. 8A under the control of the control unit 146. Of course, as the human eyes move rightwards continually, K1 or K2 moves rightwards by a further distance with respect to FIG. 8A depending on the specific distance that the human eyes move.

As shown in FIG. 8C, when the human eyes move leftwards, K1 or K2 also moves leftwards by a certain distance correspondingly. Specifically in FIG. 8A, one period of bright and dark stripes move leftwards by a certain distance so that the electrochromic sheets labeled by 5~6 present bright stripes that are light transmissive, while the electrochromic sheets labeled by 1~4 present dark stripes that are opaque. In FIGS. 8A~8C, the specific distance by which one period of bright and dark stripes of the dynamic grating move rightwards or leftwards depends on the position of user's eyes.

In the aforesaid way, the 3D display apparatus of the present disclosure utilizes the camera to track human-eye position information and then utilizes the control unit to change positions of the grating according to the human-eye position information so as to adapt to different observing positions of the user's two eyes, thus achieving a 3D image effect.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A three-dimensional (3D) display apparatus, comprising:
    a display;
    a camera, disposed on a front end surface of the display to track human-eye position information of human eyes; and
    a processor electrically connected to the camera, being configured to generate a control signal according to the human-eye position information;
    wherein the display comprises a dynamic grating electrically connected to the processor, the dynamic grating comprises a first substrate, an electrolyte layer, an electrochromic layer and a second substrate arranged in this order, the first substrate, the electrolyte layer and the second substrate transmit light incident thereon, the first substrate is formed with a first conductive layer on a surface thereof, the second substrate is formed with a second conductive layer on a surface thereof, the second conductive layer comprises a plurality of second electrodes and black insulation bars disposed between adjacent ones of the second electrodes, the electrochromic layer comprises a plurality of identical electrochromic sheets arranged at equal intervals and light-transmitting clearances between adjacent ones of the electrochromic sheets, the second electrodes make contact with the electrochromic sheets in one-to-one correspondence, the dynamic grating further comprises a control unit, the control unit is configured to control ON/OFF of a voltage applied to the electrochromic sheet between the first conductive layer and each of the second electrodes according to the control signal so that bright and dark stripes of the grating change in position adaptively according to different observing positions of the user's two eyes, and then the electrochromic sheets not applied with the voltage is colored by ions provided by the electrolyte layer to present dark stripes that are opaque while the electrochromic sheets applied with the voltage is decolored by ions provided by the electrolyte layer to present bright stripes that are light transmissive.

2. The 3D display apparatus of claim 1, wherein the control unit is configured to control ON/OFF of the voltage applied to the electrochromic sheet between each of the second electrodes and the first conductive layer independently.

3. The 3D display apparatus of claim 1, wherein the plurality of second electrodes arranged at equal intervals include first groups of second electrodes and second groups of second electrodes arranged alternately, each of the first groups of second electrodes includes N (where N≥2, and N is a natural number) second electrodes, each of the second groups of second electrodes includes M (where M≥2, and M is a natural number) second electrodes, all the $1^{st}$ second electrodes in the first groups of second electrodes are electrically connected to a same output terminal of the control unit, all the $2^{nd}$ second electrodes in the first groups of second electrodes are electrically connected to a same output terminal of the control unit, . . . , and all the $N^{th}$ second electrodes in the first groups of second electrodes are electrically connected to a same output terminal of the control unit, all the $1^{st}$ second electrodes in the second groups of second electrodes are electrically connected to a same output terminal of the control unit, all the $2^{nd}$ second electrodes in the second groups of second electrodes are electrically connected to a same output terminal of the control unit, . . . , and all the $M^{th}$ second electrodes in the second groups of second electrodes are electrically connected to a same output terminal of the control unit.

4. The 3D display apparatus of claim 1, wherein each of the electrochromic sheets has a width of a, and the light-transmissive clearance between any two adjacent electrochromic sheets has a width of b, where a≥5b.

5. The 3D display apparatus of claim 1, wherein each of the electrochromic sheets comprises: a printable electrochromic ink, or an electrochromic thin film, or a piece of electrochromic glass, or an electrically-controlled light-transmissive thin film.

6. The 3D display apparatus of claim 1, wherein the electrolyte layer comprises a printable electrolyte ink.

7. The 3D display apparatus of claim 1, wherein the first conductive layer comprises
    a printable transparent conductive ink, or a conductive plastic thin film, or a piece of indium tin oxide (ITO) conductive glass;
    each of the second electrodes comprises a printable transparent conductive ink, or a conductive plastic thin film, or a piece of ITO conductive glass.

8. A dynamic grating, used in a three-dimensional (3D) display apparatus, comprising: a first substrate, an electrolyte layer, an electrochromic layer and a second substrate arranged in this order, the first substrate, the electrolyte layer and the second substrate transmit light incident thereon, the first substrate is formed with a first conductive layer on a surface thereof, the second substrate is formed with a second conductive layer on a surface thereof, the second conductive layer comprises a plurality of second electrodes and black insulation bars disposed between adjacent ones of the second electrodes, the electrochromic layer comprises a plurality of identical electrochromic sheets arranged at equal intervals and light-transmitting clearances between adjacent ones of the electrochromic sheets, the second electrodes make contact with the electrochromic sheets in one-to-one correspondence, the dynamic grating further comprises a control unit, the control unit is configured to control ON/OFF of a voltage applied to the electrochromic sheet between the first conductive layer and each of the second electrodes according to a control signal so that bright and dark stripes of the grating change in position adaptively according to different observing positions of an user's two eyes, and then the electrochromic sheets not applied with the voltage is colored by ions provided by the electrolyte layer to present dark stripes that are opaque while the electrochromic sheets applied with the voltage is decolored by ions provided by the electrolyte layer to present bright stripes that are light transmissive.

9. The dynamic grating of claim 8, wherein the control unit is configured to control ON/OFF of the voltage applied to the electrochromic sheet between each of the second electrodes and the first conductive layer independently.

10. The dynamic grating of claim 8, wherein the plurality of second electrodes arranged at equal intervals include first groups of second electrodes and second groups of second electrodes arranged alternately, each of the first groups of second electrodes includes N (where N≥2, and N is a natural number) second electrodes, each of the second groups of second electrodes includes M (where M≥2, and M is a natural number) second electrodes, all the $1^{st}$ second electrodes in the first groups of second electrodes are electrically connected to a same output terminal of the control unit, all the $2^{nd}$ second electrodes in the first groups of second electrodes are electrically connected to a same output terminal of the control unit, . . . , and all the $N^{th}$ second electrodes in the first groups of second electrodes are electrically connected to a same output terminal of the control unit, all the $1^{st}$ second electrodes in the second groups of second electrodes are electrically connected to a same output terminal of the control unit, all the $2^{nd}$ second electrodes in the second groups of second electrodes are electrically connected to a same output terminal of the control unit, . . . , and all the $M^{th}$ second electrodes in the second groups of second electrodes are electrically connected to a same output terminal of the control unit.

11. The dynamic grating of claim 8, wherein each of the electrochromic sheets has a width of a, and the light-transmissive clearance between any two adjacent electrochromic sheets has a width of b, where a≥5b.

12. The dynamic grating of claim 8, wherein each of the electrochromic sheets comprises: a printable electrochromic ink, or an electrochromic thin film, or a piece of electrochromic glass, or an electrically-controlled light-transmissive thin film.

13. The dynamic grating of claim 8, wherein the electrolyte layer comprises a printable electrolyte ink.

14. The dynamic grating of claim 8, wherein the first conductive layer comprises a printable transparent conductive ink, or a conductive plastic thin film, or a piece of indium tin oxide (ITO) conductive glass;

each of the second electrodes comprises a printable transparent conductive ink, or a conductive plastic thin film, or a piece of ITO conductive glass.

* * * * *